United States Patent
Harrar et al.

(10) Patent No.: US 11,392,959 B1
(45) Date of Patent: Jul. 19, 2022

(54) METHOD AND SYSTEM FOR EQUIPMENT TESTING

(71) Applicant: Zodiac Systems, LLC, Hicksville, NY (US)

(72) Inventors: Derek T Harrar, Devon, PA (US);
Richard Neill, Garrison, NY (US);
Valerii Grishin, Farmingville, NY (US)

(73) Assignee: ZODIAC SYSTEMS, LLC, Hicksville, NY (US)

( * ) Notice: Subject to any disclaimer, the term of this patent is extended or adjusted under 35 U.S.C. 154(b) by 195 days.

(21) Appl. No.: 16/800,785

(22) Filed: Feb. 25, 2020

Related U.S. Application Data

(60) Provisional application No. 62/810,450, filed on Feb. 26, 2019.

(51) Int. Cl.
| | | |
|---|---|---|
| *G06Q 30/00* | (2012.01) | |
| *H04N 21/442* | (2011.01) | |
| *H04N 17/04* | (2006.01) | |
| *G06Q 10/10* | (2012.01) | |

(52) U.S. Cl.
CPC .......... *G06Q 30/016* (2013.01); *G06Q 10/10* (2013.01); *H04N 17/04* (2013.01); *H04N 21/4424* (2013.01)

(58) Field of Classification Search
CPC ...... G06Q 30/016; G06Q 10/10; H04N 17/04; H04N 21/4424
See application file for complete search history.

(56) References Cited

U.S. PATENT DOCUMENTS

| | | | | |
|---|---|---|---|---|
| 2004/0143470 A1* | 7/2004 | Myrick | ............... | G06Q 50/265 705/7.34 |
| 2007/0183746 A1* | 8/2007 | Haeuser | ............... | H04N 7/163 386/214 |
| 2007/0199049 A1* | 8/2007 | Ziebell | ............... | H04L 63/10 726/3 |
| 2008/0275956 A1* | 11/2008 | Saxena | ............... | G06F 16/2358 709/206 |
| 2012/0330769 A1* | 12/2012 | Arceo | ............... | G06Q 20/32 455/411 |
| 2013/0179833 A1* | 7/2013 | Stallings | ............... | G06F 3/0482 715/810 |
| 2013/0339930 A1* | 12/2013 | Xu | ............... | G06F 11/3684 717/125 |
| 2015/0081570 A1* | 3/2015 | Gedela | ............... | G06Q 30/01 705/304 |
| 2015/0249512 A1* | 9/2015 | Adimatyam | ............... | H04H 20/12 725/107 |

(Continued)

*Primary Examiner* — Dhairya A Patel
(74) *Attorney, Agent, or Firm* — Lawrence G. Fridman, Esq; Feigin & Fridman, LLC

(57) ABSTRACT

A method of testing a managed networked video-delivery devices or delivery devices at a base location consists of the following steps. A customer disconnection notice is issued to a service provider resulted in a disconnection event/state of the delivery device. A series of tests are conducted on the delivery device at the customer location. Reprogramming and resetting operations are carried out on the delivery device simultaneously with the disconnection event/state occurring at the service provider prior to retrieval of the device from the customer location, to prepare the delivery device for future use prior to receipt thereof by the service provider.

15 Claims, 6 Drawing Sheets

(56) References Cited

U.S. PATENT DOCUMENTS

| | | | |
|---|---|---|---|
| 2017/0039194 A1* | 2/2017 | Tschetter | G06F 16/93 |
| 2017/0331642 A1* | 11/2017 | Lyotier | H04L 12/5691 |
| 2017/0347278 A1* | 11/2017 | Gonzalez | H04W 76/10 |
| 2019/0050791 A1* | 2/2019 | Larson | G06Q 10/087 |
| 2021/0083926 A1* | 3/2021 | Costa | G06N 20/10 |
| 2021/0374675 A1* | 12/2021 | George | H04L 63/1408 |
| 2022/0150973 A1* | 5/2022 | Lim | H04W 74/006 |

* cited by examiner

METHOD AND SYSTEM FOR EQUIPMENT TESTING

REFERENCE TO RELATED APPLICATION

This Application claims priority of U.S. Provisional Application Ser. No. 62/810,450 filed Feb. 26, 2019, the entire disclosure of which is hereby incorporated by reference.

FIELD OF THE INVENTION

The invention relates in general to the field of testing electronic and communication devices, and in particular it relates to testing of managed video networked devices at a base location, without a need for a visit by a technical personnel of an operator.

BACKGROUND OF THE INVENTION

Cable, telephone, satellite and other video and wired and wireless telecommunications operators ("Operators") around the world utilize various service delivery devices, such as set-top boxes or other video-delivery devices; modems, routers, gateways or other wired or wireless broadband delivery devices; or other customer premise equipment, consumer electronics devices or Internet-of-Things (IoT) devices to deliver their services ("Delivery Devices"). Such industrial Delivery Devices are deployed, connected and disconnected in massive volumes, and oftentimes inventoried at warehouses run by or on behalf of these Operators. The purchasing, tracking, delivery, installation, warehousing, testing and other logistics surrounding Delivery Devices may represent a significant area of overhead for a typical Operator.

Using a set-top box disconnect warehouse cycle as one example of Operator Delivery Device logistics, upon receiving a set-top box Delivery Device from a customer in a disconnect mode, the set-top box Delivery Device must be "cleaned and screened", whereby it is cleaned, tested and otherwise restored or reset for provision to the next customer. Testing in particular requires the set-top box Delivery Device to be reconnected to the plant or a network in the warehouse. This task represents real manual labor on behalf of warehouse employees, and also extends the downtime that the set-top box Delivery Device does not generate revenue. Warehouses often have pallets of set-top box Delivery Devices waiting for testing prior to be placed in the field again.

Such warehouses often do not pursue best practices and are underfunded. For example, in many cases there is no traceability of the set-top box Delivery Devices lifecycle across disconnect and connect modes. There are no means to track application, where a set-top box Delivery Device is disconnected due to a service call rather than a simple disconnect mode. A service call disconnect suggests the set-top box Delivery Device might have some fault that should be tracked persistently, but it is not. As a result, unless testing protocol picks up an issue, it is plausible that a faulty set-top box Delivery Device could be installed in another subscriber home, without an appropriate depth of testing to identify or rule out an issue with that Delivery Device.

In some applications, prior to resetting and starting a testing protocol, the set-topbox Delivery Device must "sit" on the plant in the warehouse overnight or longer, while the network controller (DAC, DNCS, etc.) "pulls" unreported PPV (Pay Per View) transactions or other service history data out of the set-top box Delivery Device. If the set-top box Delivery Device is reset prior to such a locally-stored transaction being polled and uploaded to the billing system, that PPV revenue is lost forever.

Thus, there has been a long-felt and unsolved need for a method and a system for testing protocols or other applications and adding other systems, such as an inventory system to enact traceability, wherein such method and system represents a meaningful cost savings to the operator by eliminating or reducing the need for testing of Delivery Devices. There is also a need for a method and a system to conduct testing protocols on Delivery Devices in situ, at the customer location, so as to ensure it is operating within performance parameters and to ensure full operability of the Delivery Device in the realworld field environment rather than just in a lab. Such a remote testing system could proactively antagonize Delivery Devices in consumer homes to evaluate different testing conditions and perform "chaos testing" in the deployed environment while not being used by customers in order to evaluate overall systems performance in artificial outage conditions approximated by the system.

SUMMARY OF THE INVENTION

One aspect of the invention provides a method of testing and managing of at least one managed networked video-delivery device or a Delivery Device at a base location without the need for a visit by a technical personnel of an operator to the base location. The method comprises the following essential steps. Initially a customer disconnection notice is issued to a service provider resulted in a disconnection state of the delivery device. Manual interaction with the delivery device is simulated and a series of automated testing procedures is conducted on the delivery device at the base location. Information about services that took place on the delivery devices is retrieved (but not finalized) by reporting such occurrences to service provider systems. Automated health check of the delivery device at a selected household is conducted, and diagnostic information is retrieved from the individual delivery devices. Automated chaos testing is arranged for the entire population of the delivery devices. Multiple applicable operations on the delivery device are conducted including reprogramming, clearing, resetting, factory reset, simultaneously with the disconnection state occurring at the service provider prior to retrieval of the delivery device from the base location. Multiple test reports are generated, including chaos test reports, certification test reports, and health check reports for use by service provider personnel. In the method of the invention the above steps are carried out individually or organized into workflows by Matrix server depending on a specific application. Simulating manual interactions with managed Delivery Device are performed by the operator personnel on as needed basis and by means of the remote commands issued to delivery device.

Another aspect of the invention provides a system for testing a delivery device at a base location. Among essential aspects of the system are the following multiple software blocks. A First Software Block represents CSR/Field operations interactive application enabling a service provider to manage a customer account, including running diagnostics, scheduling technical services to a base location, resetting or rebooting the delivery device. A Second Software Block includes Service Provider Business Support System (BSS) for maintaining a customer account and billing data associated with a customer and the respective delivery device. A Third Software Block represents network controller system or Operations Support System (OSS) for managing and controlling operation of multiple delivery devices and ensuring acceptable customer services levels. A Fourth Software Block represents a Matrix server or Advanced Messaging Solution (AMS) which is cloud centric, intelligent integration platform enabling multiple back-office systems such as OSS/BSS to implement business, operational and remote control processes. A Fifth Software Block represents said delivery device as part of a managed network of the service provider system, the delivery device having a software system enabling the delivery device to support testing and management processes. In the method, upon customer contacting CSR operating the First Software Block the BSS system of the the second software block is updated by means of an interface. The interface is responding by communicating to the OSS of the Third Software Block and the Matrix of the Fourth Software Block to carry out operating testing and management processes resulted in clearing the delivery device at the base location prior to receipt thereof by the service provider.

A further aspect of the invention also relates to a system for testing a delivery device at a base location. Among essential components of the system are the previously discussed multiple software blocks. In this aspect of system of the invention, as a field operations personnel requests a diagnostic report upon execution of a command from the First Software Block, the application software of the First Software Block initially requests information from the BSS system of the Second Software Block which in-turn provides device data to the CSR/Field operations application of the First Software Block.

Further in the system of the invention, as a further command is issued to the Matrix system of the Fourth Software Block it interacts with the managed delivery device to execute one or more commands to compile data required for the field operations diagnostic report.

The managed delivery device data in the system of the invention is returned through the Matrix of the Fourth Software Block for packaging necessary data for the CSR/Field operations application of the First Software Block, and a report is directed to a service provider in-route to customers base location.

DETAILED DESCRIPTION OF THE INVENTION

Figure 1:
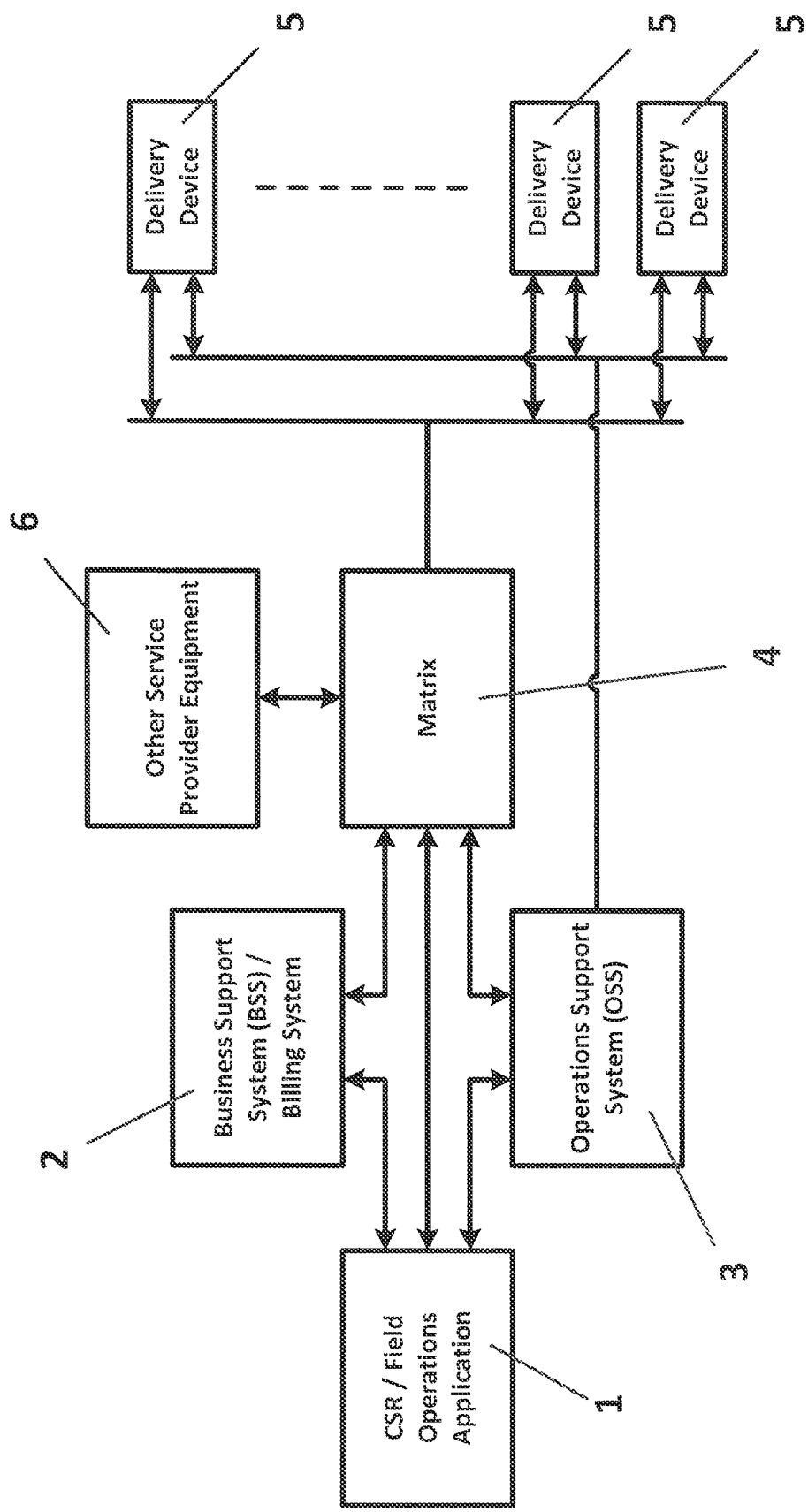
FIG. 1 is a schematic diagram of a system of the invention capable of carrying out a method of the invention.

Referring now to FIG. 1 which is a diagram illustrating general aspects of the system of the invention. The system comprises a combination of interconnected software Blocks 1-5 that function in an orchestrated and unique manner required to implement the remote, in situ, at the customer location testing of the delivery devices by the operator. This occurs without presence of the operator technical and/or support personnel at the customer location.

Software Block 1 encompasses CSR/Field operations interactive software application enabling the service provider to manage a customer account, billing and service status, upgrades/downgrades and troubleshooting activities. Such activities may include running diagnostics, scheduling technical services to the customer home, resetting or rebooting customer's Delivery Devices or other service healing situations as a subset of typical events.

Software Block 2 represents Service provider Billing System being a part of the Business Support System (BSS). The Billing System maintains customer account and billing data associated with each given subscriber and operational profiles required for the customer Delivery Devices and service fulfillment. Customer Delivery Devices are added and removed to the Billing System based on customer standing and status.

Software Block 3 represents Network Controller, which is typically in the form of the Operations Support System (OSS). The Network Controller manages and controls the operation of all customer Delivery Devices and assures that customer services levels are within acceptable levels. The OSS assures that the customer Delivery Devices are operated based on their status within the Billing System. In the event of operational issues, the Network Controller assists in the diagnosis of the customer Delivery Device.

Software Block 4 implements Zodiac Matrix server, which is also known as Advanced Messaging Solution (AMS). Matrix is a cloud centric, intelligent integration platform developed by Zodiac that enables multiple back-office systems such as OSS/BSS and the customer Delivery Devices illustrated in FIG. 1 to implement complex business and operational processes such as those forming a part of the present invention. Advanced Messaging Solution has been described by U.S. Pat. No. 9,037,667 which is hereby incorporated by reference.

For example, software workflow processes reside on the Matrix system, each designed to implement the orchestration described below. Integration of Matrix with third-party systems is supported with adapters and interfaces to OSS/BSS, the CSR/Field operations application, and other operator components.

Matrix also provides communication interfaces that support transport of necessary command and control protocols that implement the operator testing and management processes to each customer Delivery Device present in the service provider network.

Matrix also, by means of the workflows initiates automated testing procedures of the operator's network components including equipment and software components, collects test results and diagnostic data from the network components, produces aggregated summary information based on the information received, and delivers the reports to personnel of the operator, including, but not limited to, CSR and field technicians.

Software Block 5 represents Customer/Subscriber Delivery Device(s) which are owned or leased devices of one or more customer that are present within subscriber homes as part of a managed network of the service provider system. Each Delivery Device has a software system and components of the present invention enabling the Delivery Device to support the testing and management processes in a fully automated, unattended mode as well as to collect diagnostic information, and to send testing results and collected diagnostic data to the Matrix of Block 4.

Figure 2:
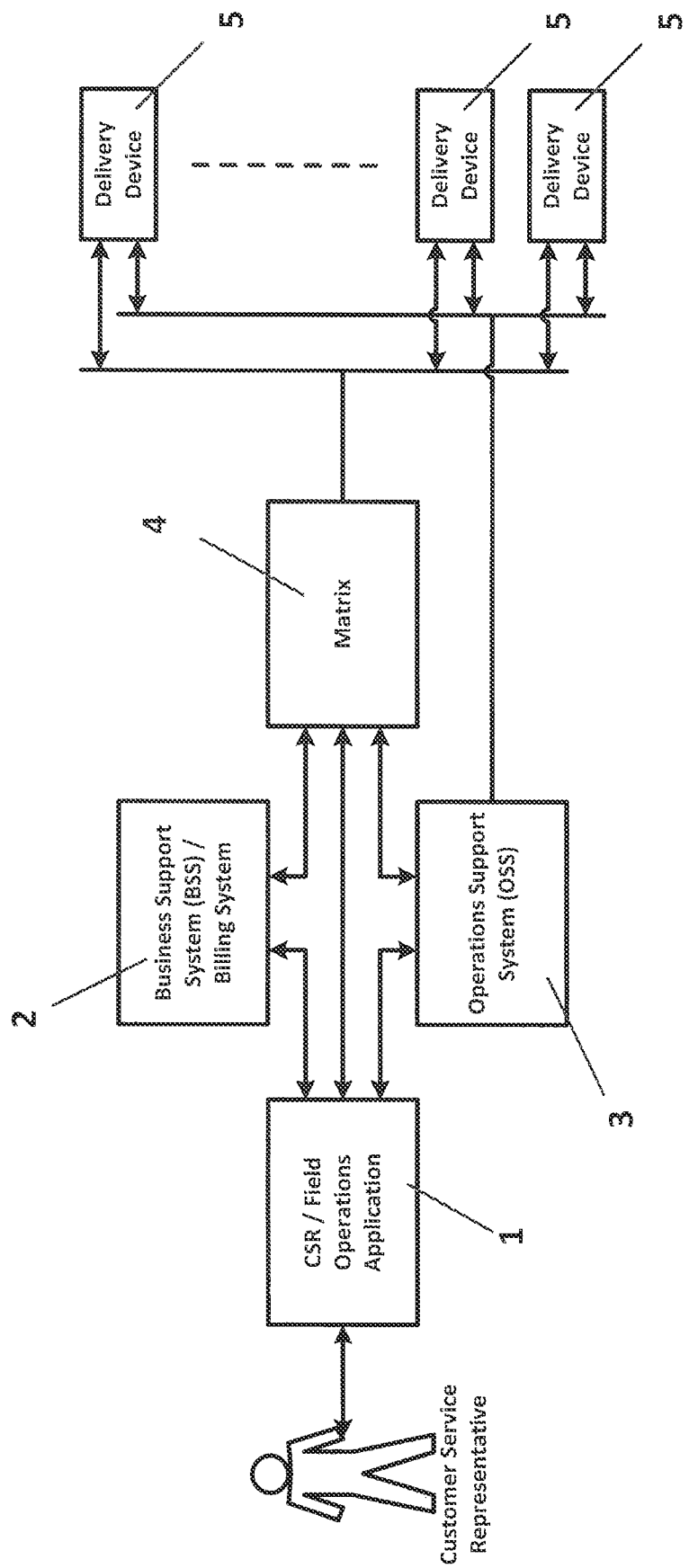
FIG. 2 is a schematic diagram illustrating a First embodiment of the system and application thereof to the method of the invention, wherein a customer service representative performs remote testing and management steps.

Referring now to FIG. 2 illustrating a First embodiment of the system and application thereof to the method of the invention. Initially a customer contacts a CSR which operates the software Block 1. The method of contact includes, but is not limited to, placing a phone call to an automated voice responder system or/and a live representative, contacting an online form on service provider web site, a mobile software application supplied by service provider, a verbatim printed and signed letter sent to a designated CSR address, etc. The CSR optionally, manually verifies functions of the managed delivery device by issuing remote control commands via Matrix of Block 4, while the delivery device remains at the customer location. This occurs without the need for a visit by the operator personnel such as field technician. The application updates the BSS system of the Block 2 through the appropriate interface which responds by communicating or signaling to both the OSS of the Block 3 and the Matrix of the Block 4 to carry out execution of the testing and management processes. The collection of software blocks and their orchestration of execution results in clearing the customer Delivery Devices at optimal time required. In the prior art execution of similar procedures typically occurs at a factory environment or upon the customer Delivery Device return to the warehouse.

As further illustrated in FIG. 2, according to application of the first embodiment to the method of the invention, initially a subscriber calls and speaks with a Customer Service Representative (CSR) to disconnect his/her service, for example since the customer is moving. A truckroll is scheduled at certain date to pick up equipment including a Delivery Device (e.g. a set top box Delivery Device). The method of the invention schedules a sequence of testing and management steps to occur at the customer location prior to the disconnection state actually taking place. More specifically, sequense of the testing steps is initiated at the customer location after the customer disconnection notice is issued to a service provider. Such disconnection notice is resulted in a disconnection event/state of the managed delivery device. CSR may be optionally connected, through software application of block 1 and Matrix of software Block 4, to the managed device and perform remote control actions simulating manual use of the device by the customer. The testing operations include, but are not limited to, testing operating system, physical device components, drivers, middleware, and individual software applications such as, as typically used on set-top box delivery devices, Guide, Settings, DVR, VOD, PPV, WatchTV, etc. as well as other software applications such as Netflix, Amazon Video, YouTube, Hulu, and other integrated or standalone third-party software applications. Although various software applications have been discussed above, it should be noted that the delivery devices having any conventional software applications are within the scope of the invention. In the current prior art practice this type of testing typically takes place in the warehouse environment. A set-top box delivery device information including, but not limited to, the serial number, software version, etc. is logged at this time. PPV transactions are cleared from the set-top box delivery device prior to connecting to the warehouse. The device is reset to its initial state which may include, but is not limited to, firmware update or downgrade, factory reset, settings reset, DVR (Digital Video Recorder) records wipe out, de-provisioning, cache purging, resetting configuration data, non-volatile memory (NVM) reset, etc. Various other planned account termination workflows can be enacted at this time, triggered by the disconnect mode/phase out event.

Figure 3:
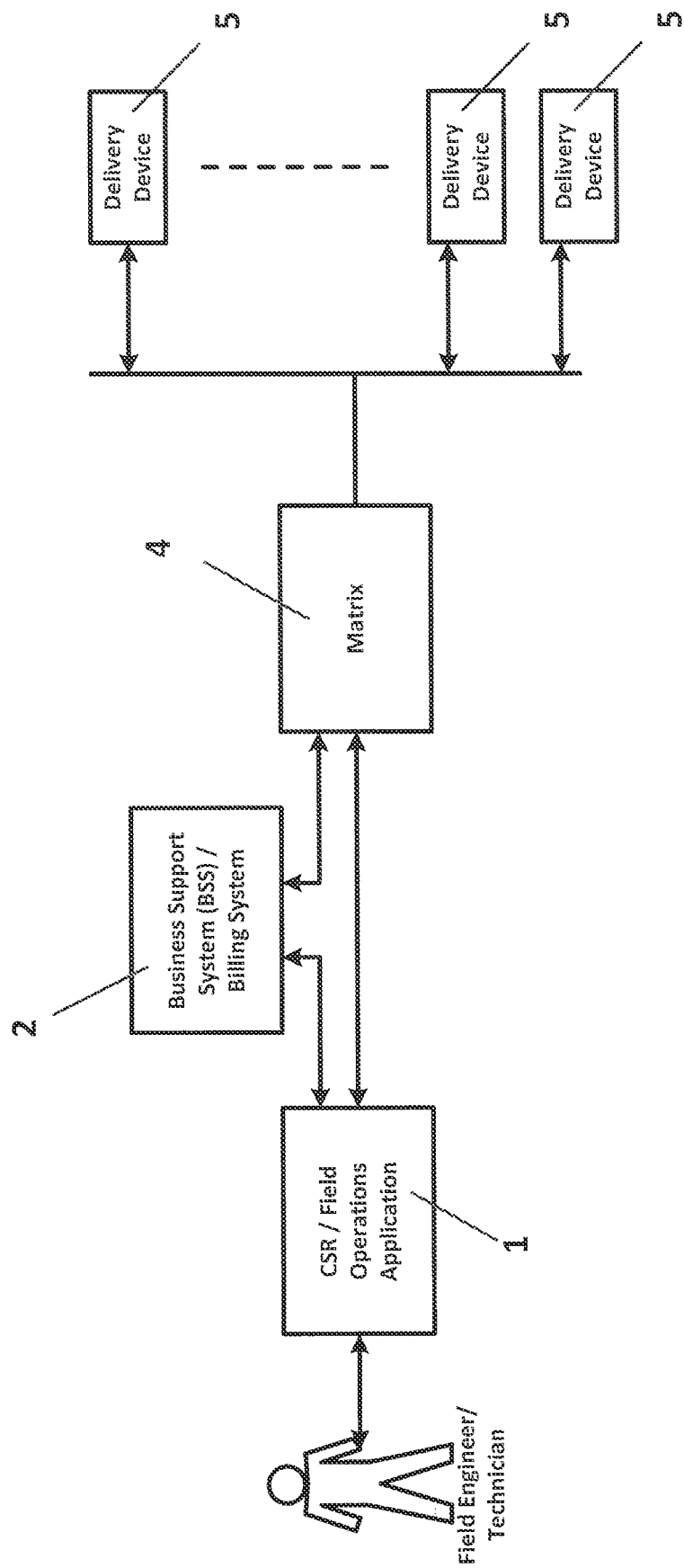
FIG. 3 is a schematic diagram illustrating a Second embodiment of the system and application thereof to the method of the invention, wherein a field engineer/technician of a service provider performs remote diagnostic steps.

Referring now to FIG. 3 illustrating a Second embodiment of the system and its application to the method of the invention. In this embodiment, a field operations personnel requests automatic generation of a diagnostic report of a delivery device upon execution of a single command from the Block 1 software application. The request is sent remotely, through Matrix of Block 4, to the customer location without the need for a field technician visit. In this case, initially the CSR/Field software application of block 1 requests information from the BSS system, which in-turn provides device data to the CSR/Field operations application of Block 1. Then, a command is issued to the Matrix system which interacts with the customer Delivery Device to execute one or more commands necessary to compile the data required for the field operations diagnostic report. The operational device data is returned through Matrix which packages up all necessary data for the CSR/Field operations application. The report can then be routed to the field technician in-route to customers premises.

As further illustrated in FIG. 3, according to application of the second system embodiment to the method of the invention, a subscriber calls with a service issue and a service visit truck roll is scheduled. Similar to the above-discussed application, testing is triggered on the set-top box delivery device prior to the service call and all information is logged in advance of the technician visit to the customer home. According to an alternative embodiment of the method of the invention, between the call and the truck roll, the set-top device is monitored or "watched" in greater detail to log potential out-of-spec performance and functions issues. Similar to the above, to reduce the troubleshooting time at the customer home, other service-specific workflows can be enacted to inform a technician prior to their visit.

The method and system of the invention are applicable to a variety of managed networked devices including, but not limited to, set-top box delivery devices, a cable modem, EMTA, router, gateway, mobile phone, tablet, TV, computer, IoT device, etc. It should be also understood that the method and system of the invention are applicable to any other state of the art delivery device on the network. The invention is expandable for use across any network elements be it a phicial device or a software component.

Similarly, the method and system of the invention are not limited to only testing upon device being removed from customer home and are applicable to many other use cases including, but not limited to, triggering, executing, reporting, and orchestrating events and/or workflows on such managed Delivery Devices.

In some applications a system north of the set-top box Delivery Device (that is a server-side counterpart such as Zodiac Matrix server, also known as Advanced Messaging Solution (AMS), is provided that can implement various disconnect or service workflows, optionally orchestrating them across BSS/OSS subsystems and logging results for future reference.

Figure 4:
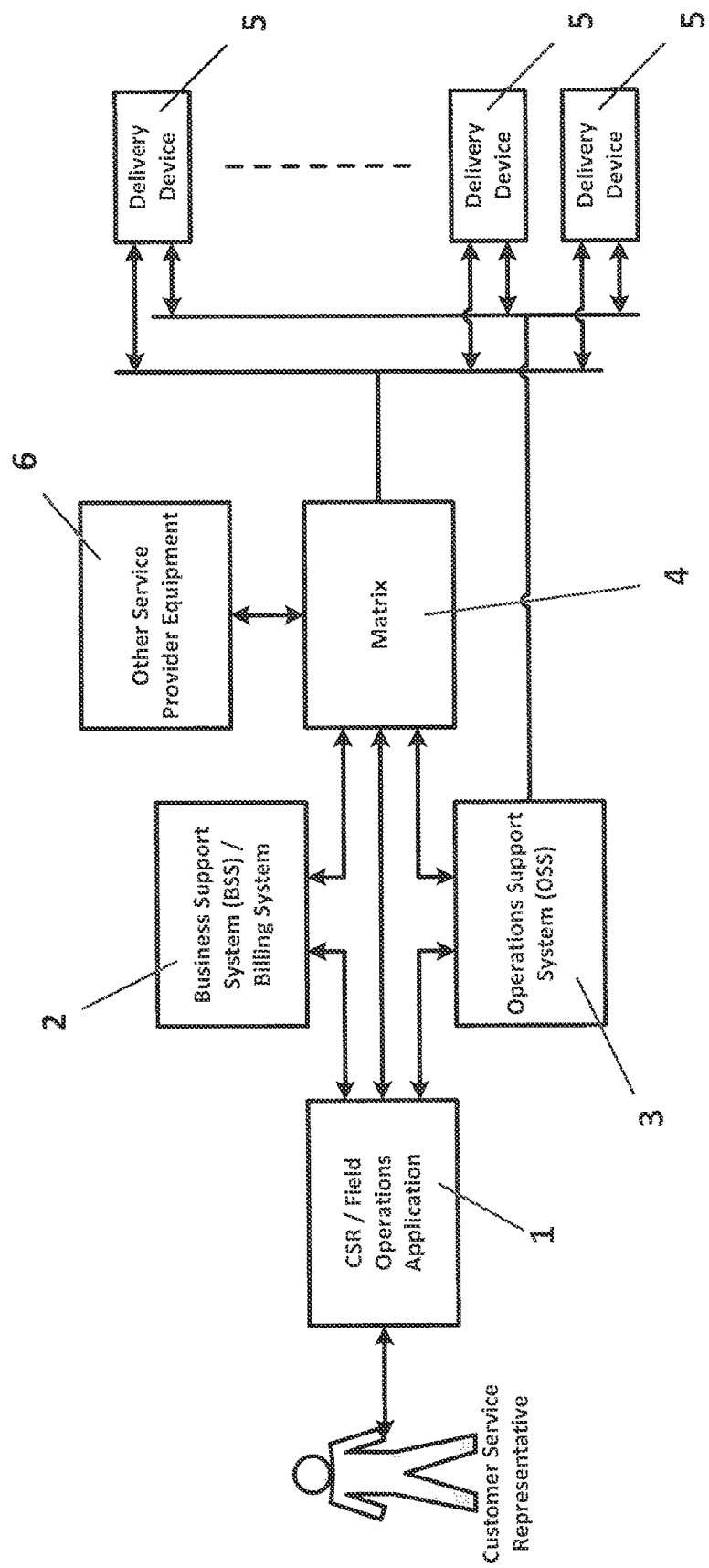
FIG. 4 is a schematic diagram illustrating a Third embodiment of the system and application thereof to the method of the invention, wherein a customer service representative performs a chaos test of selected Delivery Devices and applicable service provider equipment.

Referring now to FIG. 4 illustrating a Third embodiment of the system and application thereof to the method of the invention. In this embodiment, CSR of Block 1 performs fully automated chaos testing of service provider network by means of initiating parallel testing transaction with the Delivery Devices of Block 5 as well as applicable network components including, but not limited to, OSS and BSS, and other operator and third-party components. CSR, via software application of Block 1, triggers chaos testing in Matrix of Block 4. This testing in turn initiates, at random moments in time, fully automated testing transactions with applicable network components and subset of the customer Delivery Devices that are not in use by the customer at the time of the chaos testing. For the purpose of selecting currently unused Delivery Devices, Matrix tracks, by means of the software application on Delivery Devices, usage status of all Delivery Devices by the customers. Network components and Delivery Devices perform requested tests, collect their own diagnostic information and send test results and diagnostic information to Matrix. Matrix generates chaos testing result report including aggregated summary information and delivers it to the CSR terminal for visualization and analysis.

As further illustrated in FIG. 4, according to application of the Third embodiment to the method of the invention, service provider's CSR initiates chaos testing of their network. The middleware server orchestrator such as Zodiac Matrix server, also known as Advanced Messaging Solution (AMS), initiates random testing and remote control transaction with many randomly selected managed Delivery Devices not currently in use by the customers, network devices, and software components, collects results of the tests, and generates test result report for consumption by CSR. For the purpose of selecting currently unused Delivery Devices, Matrix tracks, by means of the software application on Delivery Devices, usage status of all Delivery Devices by the customers.

Figure 5:
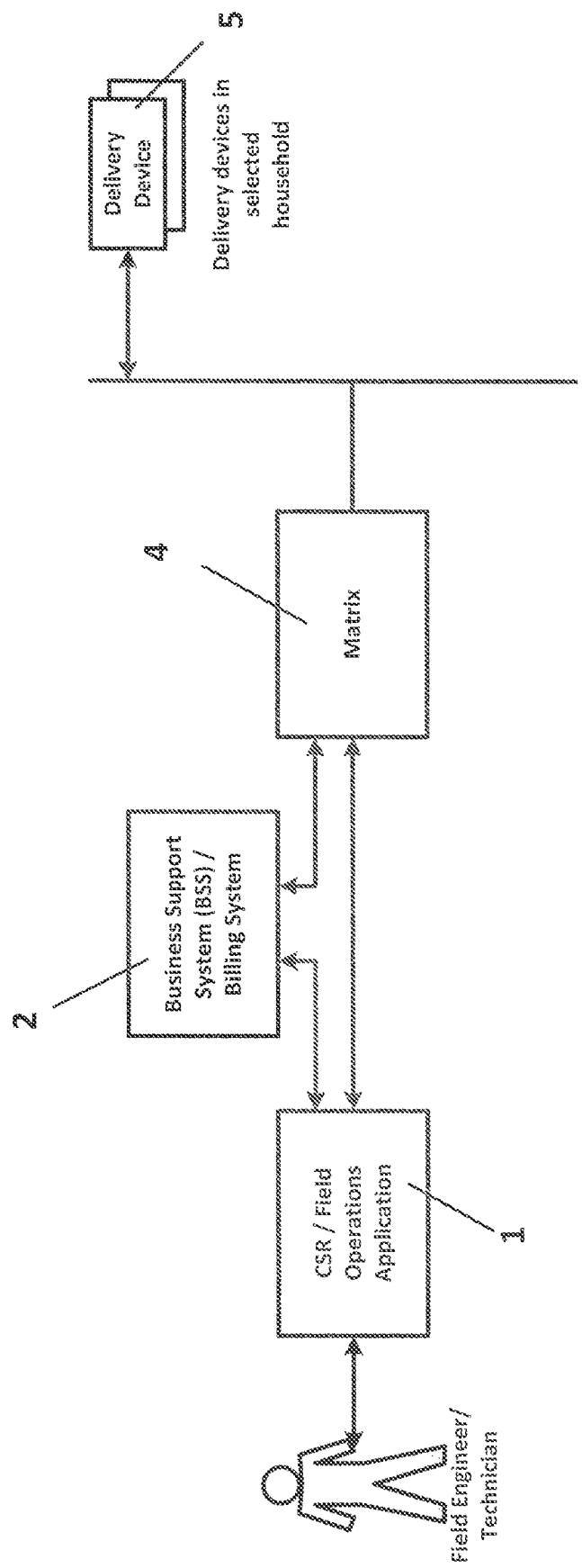
FIG. 5 is a schematic diagram illustrating a Fourth embodiment of the system and application thereof to the method of the invention, wherein a field engineer/technician of a service provider performs health check of all Delivery Devices of a selected household.

Referring now to FIG. 5 illustrating a Fourth embodiment of the system and application thereof to the method of the invention. In this embodiment, service provider field technician requests execution of the fully automated remote health check of all Delivery Devices of a selected household from the Block 1 software application at the customer location without a visit by personnel. In this case software application triggers home health check by sending request to Matrix of Block 4. The Matrix communicates with all delivery devices of block 5 of the selected household and requests execution of the applicable automated testing procedures and collection of the delivery devices diagnostic information. Delivery devices perform requested tests, collect their diagnostic information and individually send test results and diagnostic information to the Matrix. Matrix collects individual reports from the managed delivery devices, performs aggregation processing of the received information and generates home health check report with the test results, diagnostic information, and aggregated summary information about the health status of all Delivery Devices in the selected household. Matrix then delivers this report to software application of Block 1 for use by the field technician.

As further illustrated in FIG. 5, according to application of the Fourth system embodiment to the method of the invention, service provider field technician performs home health check of all managed Delivery Devices in the household by means of triggering corresponding workflow on Matrix middleware server. Matrix communicates with the managed delivery devices of the selected household using its remote-control capabilities and initiates series of parallel and/or consecutive test processes on each delivery device in the household. Upon completion of the tests, Matrix collects test results and diagnostic information from the delivery devices and generates health check report for consumption by service provider field technician.

Figure 6:
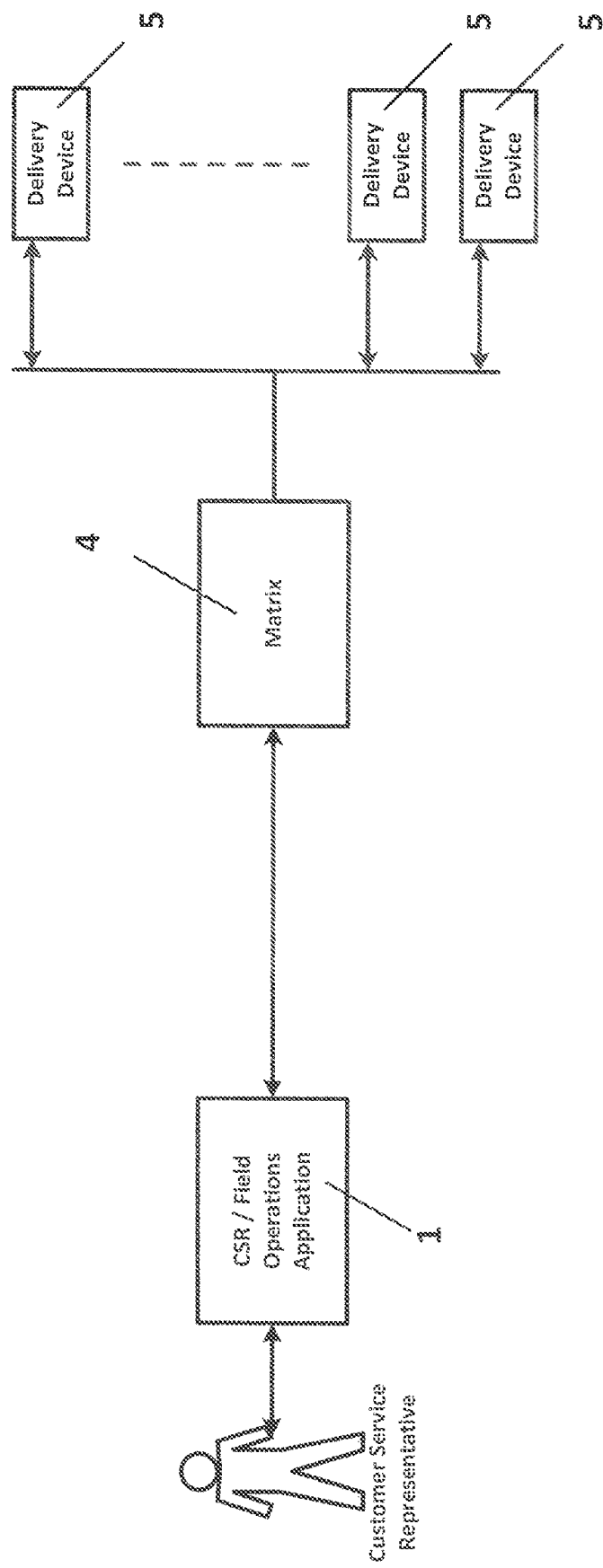
FIG. 6 is a schematic diagram illustrating a Fifth embodiment of the system and application thereof to the method of the invention, wherein a customer service representative performs an automated certification of all Delivery Devices for a forthcoming software upgrade.

Referring now to FIG. 6 illustrating a Fifth embodiment of the system and its application to the method of the invention. In this embodiment, CSR of Block 1 performs fully automated certification of the entire population of Delivery Devices of Block 5 for software upgrade while delivery devices remain at the customers locations. This occurs without field technician visit to the customers locations. CSR uses software application of Block 1 to trigger certification by sending certification request to Matrix of Block 4. Matrix communicates with the entire population of the delivery devices and requests performing applicable automated tests and collection of the diagnostic information. Delivery devices perform request tests, collect their own diagnostic information and individually communicate with Matrix to deliver test results and collected diagnostic information. Matrix collects individual reports from the entire population of delivery devices, aggregates received data, and generates certification test report with aggregated summary information and selective individual information from the delivery devices. The above occurs if the managed delivery devices need special attention or alarming issues are detected. Matrix then delivers the report to software application of Block 1 for use by CSR. The report incorporates the overall progress of the ongoing certification process and is updated by Matrix in real time as more delivery devices deliver their test reports and diagnostic information.

As also illustrated in FIG. 6, according to application of the Fifth embodiment to the method of the invention, a service provider performs certification of the entire delivery device population for the software upgrade. Service provider operations personnel triggers the certification process on Matrix middleware server. Matrix contacts all delivery device by means of its remote control capabilities and requests each device to perform applicable tests and collect diagnostic information. Upon completion of tests, the delivery devices notify Matrix with test results and collected diagnostic information. Matrix generates upgrade certification report for service provider operations personnel for making an informed decision about software upgrade.

This invention involves testing the operator delivery device prior to leaving the subscriber home.

Although the method and system of the invention have been discussed above regarding five most typical applications, it should be obvious to a person of ordinary skill in the present art that the method and system of the invention should be also applicable to a greater variety of scenarios consisting of various steps constituting the above-discussed five typical applications and arranged in various sequences using Matrix's workflow management capabilities.

What is claimed is:
1. A method of testing and managing of at least one managed networked device or a delivery device at a base location, without a need for a visit by technical personnel of an operator, said method comprising the steps of:
   issuing a customer disconnection notice to a service provider resulted in a disconnection state of the delivery device;
   simulating manual interaction with the delivery device;

conducting a series of automated testing procedures on the delivery device at the base location;

retrieving information about services taken place on the delivery device, but not finalized by reporting such occurrences to service provider systems;

conducting an automated health check of the individual delivery device or all delivery devices at a selected household;

retrieving diagnostic information from the said at least one individual delivery device;

certifying the delivery device for software upgrade;

conducting automated chaos testing of operator network including OSS, BSS, Delivery Devices, other service provider and third-party components;

conducting multiple operations on the delivery device selected from the group including: reprogramming, clearing, resetting and factory reset, said operations taking place simultaneously with the disconnection state occurring at the service provider prior to retrieval of the delivery device from the base location, so as to prepare the delivery device for future use prior to receipt thereof by the service provider and eliminating the need for reconnecting the Delivery Device to a plant at a warehouse and eliminating the need for testing at said warehouse plant;

generating multiple test reports, said reports are selected from the group including chaos test reports, certification test reports, and health check reports for use by service provider personnel;

wherein each of said steps is used individually and/or organized into workflows by Matrix depending on application;

wherein said automated testing procedures are applied to operating system, physical device components, drivers, middleware, and individual software application and services; and wherein simulating manual interactions with managed delivery device is performed by operator personnel on as needed basis and by means of the remote commands issued to delivery device.

2. The method of claim 1, wherein the delivery device is selected from the group including: a set-top box, router, gateway, IoT device, and other wired or wireless managed networked device; and the base location is a customer location.

3. The method of claim 1, wherein the disconnection state is triggered by a phone conversation of a customer with a customer support representative.

4. The method of claim 1, wherein the disconnection state is triggered by an online transaction from an application connected via communication systems including an Internet.

5. The method of claim 1, wherein the disconnection state is triggered by a document delivered from the customer to the service provider.

6. The method of claim 1, wherein the disconnection state is triggered by sending a notification from a software application to a customer mobile device selected from the group including: smartphone and tablet, wherein said software application is provided to the customer by the service provider.

7. The method of claim 1, wherein the testing operations triggered by the disconnection state result in executing multiplicity of tests to assure viability and proper operation of the delivery device, retrieval of information necessary to manage changes in service provider inventory and logistics processing.

8. The method of claim 1, wherein the testing operations triggered by the disconnection state result in executing multiple operations to clear customer specific data modes, said data modes are selected from the group including: parental controls, pay-per-view information, DVR record, settings, NVM, etc.

9. The method of claim 1, wherein the testing operations triggered by the disconnection state result in executing additional operations in the service provider systems, said additional operations are selected from the group including: further progressing the disconnection state of the delivery device, change in inventory and logistics.

10. The method of claim 9, wherein said additional operations are further selected from the group including: automatically executing series of testing operations on the delivery device, so that said series of testing operations generate a diagnostic report data to the service provider in real-time, and rerouting said diagnostic report data to the operator personnel on as needed basis, said operator personnel is selected from the group including: operational engineers, customer support representatives, and field support technicians.

11. The method of claim 1, wherein the testing operations result in additional operations on the delivery device to place said delivery device into its original software states including a factory reset.

12. The method of claim 1, wherein said delivery device may be in a fault state or not operating in accordance with service level specifications.

13. The method of claim 12, wherein said generated reports are further selected from the group including: additional diagnostic data and applied analytics to provide recommended procedures, operations, processes, and functional work-flows to the service provider to minimize, optimize, and reduce time required spent at the base location.

14. The method of claim 1, wherein the step of retrieving diagnostic information further comprises retrieving diagnostic information from the group including: delivery devices of a selected household, and entire population of the delivery devices.

15. The method of claim 1, wherein said at least one individual delivery device is a delivery device of the selected household or represents the entire population of the delivery devices.

* * * * *